United States Patent [19]

Grimes

[11] Patent Number: 5,553,128
[45] Date of Patent: Sep. 3, 1996

[54] CONTROL OF CALL FORWARDING BY A TARGET TELEPHONE

[75] Inventor: Gary J. Grimes, Birmingham, Ala.

[73] Assignee: Lucent Technologies Inc., Murray Hill, N.J.

[21] Appl. No.: 567,812

[22] Filed: Dec. 6, 1995

Related U.S. Application Data

[63] Continuation of Ser. No. 329,582, Oct. 26, 1994, abandoned.

[51] Int. Cl.⁶ .............................. H04M 3/54; H04M 3/58
[52] U.S. Cl. .......................... 379/211; 379/210; 379/221
[58] Field of Search .................................. 379/201, 207, 379/211, 212, 221, 219, 220, 269, 210

[56] References Cited

U.S. PATENT DOCUMENTS

| | | | |
|---|---|---|---|
| 4,277,649 | 7/1981 | Sheinbein | 379/201 |
| 4,658,416 | 4/1987 | Tanaka | 379/57 |
| 4,680,785 | 7/1987 | Akiyama et al. | 379/57 |
| 4,748,655 | 5/1988 | Thrower et al. | 379/60 |
| 4,940,963 | 7/1990 | Gutman et al. | 340/313 |
| 5,018,194 | 5/1991 | Suzuki et al. | 379/211 |
| 5,023,868 | 6/1991 | Davidson et al. | 379/211 |
| 5,109,405 | 4/1992 | Morganstein | 379/89 |
| 5,182,750 | 1/1993 | Bales et al. | 379/221 |
| 5,185,742 | 2/1993 | Bales et al. | 379/93 |
| 5,197,096 | 3/1993 | Sakuma et al. | 379/211 |
| 5,329,578 | 7/1994 | Brennan et al. | 379/211 |
| 5,375,167 | 12/1994 | Bales et al. | 379/207 |
| 5,377,262 | 12/1994 | Bales et al. | 379/230 |
| 5,386,466 | 1/1995 | Bales et al. | 379/220 |
| 5,390,242 | 2/1995 | Bales et al. | 379/221 |

FOREIGN PATENT DOCUMENTS

| | | | |
|---|---|---|---|
| 0536949 | 4/1993 | European Pat. Off. | H04M 3/54 |
| 63-164661 | 7/1988 | Japan | H04M 3/42 |
| 61309652 | 7/1988 | Japan | H04M 3/42 |

*Primary Examiner*—Jeffery Hofsass
*Assistant Examiner*—Scott Wolinsky
*Attorney, Agent, or Firm*—John C. Moran

[57] ABSTRACT

A telephone set and method for controlling what calls are forwarded to the telephone set. The telephone set has a terminal processor having an internal memory in which are stored a control program and data. The terminal processor under control of the program controls operation with respect to forwarded calls using the data. In response to the data, the terminal processor can block all forwarded calls from all other telephone sets, from a predetermined list of telephone sets, or from all telephone sets except for a predetermined list of telephone sets. Call forwarding can be blocked from a single forwarding telephone set not known to the user of a telephone set by the user actuating a button during a forwarded call being processed from the forwarding telephone set. In addition, the terminal processor can block all forwarded calls except those from other designated telephone sets.

24 Claims, 10 Drawing Sheets

CONTROL OF CALL FORWARDING BY A TARGET TELEPHONE

This application is a continuation of application Ser. No. 08/329,582, filed on Oct. 26, 1994, now abandoned.

TECHNICAL FIELD

This invention relates to control of call forwarding in a telecommunications switching system.

BACKGROUND OF THE INVENTION

In prior art communication switching systems, call forwarding is a well known feature. This feature allows a user to transfer an incoming call from the user's telephone set to another telephone set. In addition, it is known within computer systems to be able to transfer electronic mail from the logon of one user to the logon of another user. In telephone systems, the call forwarding feature is invoked by the user of a telephone dialing a special code that is recognized by the communication system serving the user's telephone set as a code invoking call forwarding. After invoking call forwarding, the user then dials the extension to which the user wishes calls to be forwarded. In addition, published European Patent Office Patent Application EP 536949 discloses a telecommunication system in which telephone calls are automatically forwarded to a telephone set that is near a radio pager. The forwarded calls are intended for the user of the pager.

The problem with call forwarding is that the user of the target telephone (the telephone receiving the forwarded telephone calls) has no control over the prior art call forwarding features. The result is that a user of a telephone set is bothered by undesired forwarded calls. Such calls can result due to the previously described pager or as a result of an individual making a mistake when invoking the call forwarding feature.

SUMMARY OF THE INVENTION

The foregoing problems are solved and a technical advance is achieved by a telecommunication switching system that allows a user of a target telephone set to control what calls are forwarded to the target telephone set. The user can choose to block all forwarded calls from all users or lines, from a predetermined list of telephone users or lines, or from all users or lines except for a predetermined list of users or lines. Advantageously, call forwarding can be blocked from a single origination telephone set not known to the target user by the target user actuating a button during the forwarded call from that telephone set. In addition, the forwarded call control feature allows for the blocking of calls from a specified telephone line or user but allows calls to be made directly from that telephone line or user.

Other and further aspects of the present invention will become apparent during the course of the following description and by reference to the accompanying drawing.

DETAILED DESCRIPTION

Figure 1:
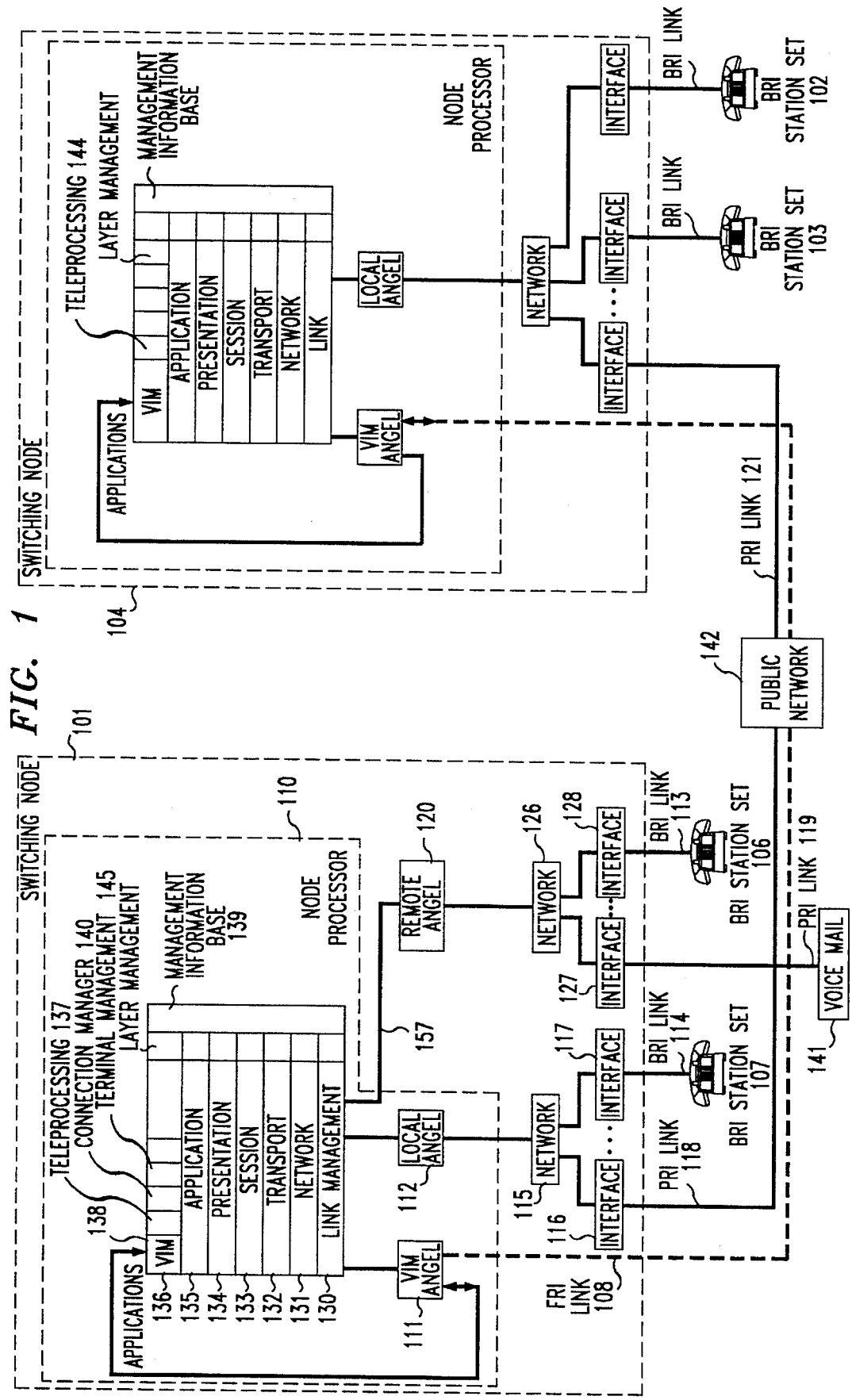
FIG. 1 illustrates, in block diagram form, a telecommunication switching system embodying the inventive concept.

FIG. 1 shows a telecommunication system having a plurality of switching nodes with each of the switching nodes 101 and 104 providing communication for a plurality of telephones such as BRI station sets 102, 103, 106, and 107. Advantageously, the switching nodes of FIG. 1 function as integrated system to provide telecommunication services. Switching nodes 101 and 104 are interconnected by public network 142. Voice mail system 141 is connected to switching node 101 via PRI link 119. Switching node 101 is interconnected to public network 142 via PRI link 118 and switching node 104 is interconnected to public network 142 via PRI link 121. Established on this interconnection between switching node 101 and switching node 104 is a flexible rate interface (FRI) link which utilizes the PRI links 118 and 121. The manner in which FRI link 108 is implemented is disclosed in detail in U.S. Pat. No. 5,182,751 which is hereby incorporated by reference. FRI link 108 functions as if a ISDN PRI link was directly interconnecting switching nodes 101 and 104. The teleprocessing applications, such as teleprocessing application 137 in switching node 101, implement the telecommunications features such as the forwarded call control feature which is the subject of the present invention.

To further understand the forwarded call control feature, consider the following example of the first aspect of the invention. BRI station set 106 is the target station set, i.e., the station set to which calls are going to be forwarded. BRI station set 107 is the station set from which calls are being forwarded to BRI station set 106. BRI station sets 102 and 103 are the station sets that originate the call to BRI station set 107. Consider the first case where BRI station set 106 will receive no call forwarded calls. BRI station set 102 places a call to BRI station set 107 that is forwarding its calls to BRI station set 106. This call is initiated over FRI link 108 using standard ISDN call set up messages. When the call set up message is received by switching node 101, this call set up message eventually is received by teleprocessing application 137 after being processing by the various software layers illustrated in FIG. 1. Teleprocessing application 137 examines the destination set number in the call set up message and determines that the destination set is BRI station set 107. Teleprocessing application 137 then interrogates internal tables stored in management information base 139 to determine to which station set the incoming call should be forwarded from BRI station set 107. Entries in the management information base 139 designate that calls are to be forwarded to BRI station set 106. Upon examining internal tables related to BRI station set 106, teleprocessing application 137 determines that BRI station set 106 is not receiving any forwarded calls. Teleprocessing application 137 then connects the incoming call to voice mail system 141 which handles the call as if call forwarding had not been attempted to BRI station set 106. The examination of the internal tables related to BRI station set 106 may also indicate that all forwarded calls are to be accepted.

The second aspect of the forwarded call control feature is now considered, that of only allowing calls from designated station sets to be forwarded to BRI station set 106. Assuming that BRI station set 107 is not on that list, then the call described above will be blocked from being forwarded to BRI station set 106 by teleprocessing application 137. When teleprocessing application 137 receives the call destined for BRI station set 107, the application determines that BRI station set 107 has invoked call forwarding to BRI station set 106 and that BRI station set 106 will not accept call forwarding from BRI station set 107. Once again, teleprocessing application 137 transfers the call to voice mail 141.

In the third aspect of the invention, BRI station set 106 has designated that it will only accept call forwarding messages from BRI station set 107. A call placed to BRI station set 107 from BRI station set 102 is transferred to BRI station set 106. All other forwarded calls will be rejected and will be sent to voice mail 141.

The fourth aspect of the invention allows the user of the target station set to designate other station sets from which a forwarded call will not be accepted. Consider the following example where station set 106 will accept forwarded calls from any station set and where BRI station set 103 has invoked call forwarding to BRI station set 106. When BRI station set 102 places a call to BRI station set 103, teleprocessing application 144 of switching node 104 transmits a call set up message for this call to teleprocessing application 137 and includes an indication that the call is being call forwarded from BRI station set 103. Teleprocessing application 137 is responsive to this call set up message to transfer the call set up message to BRI station set 106 but to display on BRI station set 106 the fact that it is a call forwarded call from BRI station set 103. Upon seeing that it is a call forwarded call from BRI station set 103, the user of BRI station set 106 activates the block call forwarding button on BRI station set 106 which causes the BRI station set 103 to be on a list maintained in management information base 139 as a station set from which BRI station set 106 will not accept call forwarded calls. In addition, teleprocessing application 137 transmits a call reject ISDN message back to teleprocessing application 144 indicating the fact that the call forwarding has been rejected. Note, that the forwarded call control feature will not block calls directly made from BRI station sets 102, 103, and 107 to BRI station set 106.

A fifth aspect of the invention is to give the user of a BRI station set a warning tone when the user forwards their calls to a BRI station set that is not accepting forwarded calls from the BRI station set of the user. Upon receiving the warning, the user trying to forwarded their calls must contact the user of the target BRI station set and have that user activate the forwarding of calls.

A sixth aspect of the invention allows the user of the target station set to allow a maximum number of forwarded calls per day to be accepted in the first aspect of the invention. Further, the sixth aspect is combined with the second aspect of the invention to only allow a fixed number of forwarded calls per day from each of the designated station sets.

Consider the software architecture of the switching nodes of FIG. 1. This architecture is based on the conventional OSI model modified to implement the ISDN protocol. Certain further modifications have been made to the standard model in order to accomplish the expansion of ISDN capabilities to include the FRI capabilities of the invention. Looking ahead, it will be seen that encapsulated FRI D channel information communicated on a packetized B channel enters the software structure at a low software layer and is immediately communicated to the highest software layer, where the FRI D channel information is recovered and reinserted into an intermediate layer that processes all D channel information. By reinserting the FRI D channel information, the various functions controlling the FRI link can be carried out by higher software layers in a transparent manner that is the same as if those software layers were processing D channel information from a PRI or BRI link. Similarly, D channel information from those software layers for the FRI D channel is transferred from the intermediate software layer to the highest software layer which encapsulates it and communicates the encapsulated FRI D channel information to the low software layer for transmission on the packetized channel.

In order to lay the groundwork for these operations, it is useful to describe the various software layers of the software architecture.

The physical layer is implemented in local angel 112, remote angel 120, networks 115 and 126, interfaces 116, 117, 127, and 128. The principal function of physical layer is to terminate physical links. Specifically, the physical layer is responsible for maintaining physical channels and for controlling physical subchannels thereon. Physical layer comprises a software portion and physical interfaces. Further, the software portion of physical layer is responsible for the direct control of the physical interfaces to which physical links communicating PRI and BRI information terminate. Physical layer presents to link layer 130 physical subchannels and physical channels as entities controllable by link layer 130.

The primary function of link layer 130 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 130 and physical layer. (An example of this type of protocol is the LAPD packet protocol used in ISDN Q.921. In the ISDN standard, link layer 130 terminates the LAPD protocol.) Link layer 130 can support multiple protocols so that the upper layers are uneffected by the different protocols being utilized. Further, link layer 130 allows higher software layers to control physical layer in an abstract manner.

Link layer 130 is divided into link interface and link management. The reason for this division is set forth herein below. It will be helpful at this point to discuss the communication of ISDN signals over a D channel to help readers, for example, who have only a rudimentary knowledge of the communication of ISDN signals over a D channel. At link layer 130, a plurality of logical links is established on a D channel. Only one of these logical links communicates ISDN control signals, and this logical link is referred to herein as a logical D channel (LDC). The LDC is identified by a logical D channel number (LDCN).

Link interface does the majority of the functions performed by link layer 130, including the establishment of the logical links. Link management identifies the various link interfaces for higher software layers. Further, link management communicates information between the logical links and higher software layers.

Network layer 131 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 104 via FRI link 108, network layer 131 of switching node 101 negotiates with its peer layer (the corresponding network layer 131 in switching node 102) in order to obtain allocation of a B channel in FRI link 108—a procedure later to be repeated if a second B channel is desired. This negotiation is carded out using standard ISDN Q.931 messages such as the call setup and connection messages via the LDC set up on the D channel of FRI link 108. Network layer 131 identifies all B channels of given interface with the LDC for that interface. Network layer 131 is only concerned with the establishment of a call from one point to another point (e.g., node to node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 131 receives information from another node concerning a call via a LDC. As information is received on the LDC, a call reference number is utilized to identify the call associated with this message. The call reference number is selected by the originating network layer during call set up in accordance with the ISDN standard. Details of this identification are given with respect to FIG. 4.

Transport layer 132, is the key element that allows the routing of a call through a complex system having multiple nodes as illustrated in FIG. 1. Its primary function is to manage the routing of calls externally, i.e., between switching nodes. Transport layer 132 views the system of FIG. 1 in terms of nodes and is concerned with routing calls from its own node to other nodes or endpoints. (As explained in the detailed discussion of session layer 133, that layer, not transport layer 132, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 132 is the first layer that starts to take a global view of the overall system illustrated in FIG. 1. Transport layer 132 uses information provided by session layer 133 to select the inter-node path. The transport layer performs its task of routing between various nodes by the utilization of tables defining the available paths and the options on those paths.

Communication between transport layers is done by network layer 131 using established LDCs. Transport layer 132 communicates information destined for its peers to network layer 131, and network layer 131 packages this information within the information elements, IEs, of standard ISDN Q.931 messages. Network layer 131 uses the LDC that has been set up to a particular node to communicate this information to its peer network layer. Similarly, when another network layer receives information of this type, the other network layer unpackages information and then directs the information to the transport layer.

The primary function of session layer 133 is to establish communication among endpoints with all endpoints considered to be applications including, for example, a BRI telephone. Significantly, in the present context these endpoints are applications such as the application performing the call processing features. In any event, connections between such endpoints is considered to be a call. A session is set up by session layer 133 any time two applications require communication with each other. As noted earlier, session layer 133 deals only in terms of switching nodes and applications on those switching nodes and relies on transport layer 132 to establish paths to other switching nodes. Session layer 133 identifies the called application by an address which previously in telecommunication was thought of as only a telephone number but has a much broader concept in the Q.931 protocol. From the address, session layer 133 determines the destination switching node. Session layer 133 sets up a call to the destination switching node by communicating with the session layer of the destination switching node. The communication with the other session layer is accomplished by having the session layer request its transport layer to place a call to the other switching node so that a connection can be made for a particular address. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 134 of FIG. 1 invokes a complex protocol in order to groom the information being communicated between applications so that the applications are totally divorced from the protocol used to communicate the information. A presentation level protocol allows an application to communicate with a peer application across a transport path.

Finally, application layer 135 manages the resources needed by the applications running at layer 136. When an application at level 136 is communicating with another peer application, the application is unaware of how many other applications exist or where these other applications are located. It is the function of application layer 135 to determine and use such details, consequently allowing the applications to be written in a very abstract manner.

Figure 2:
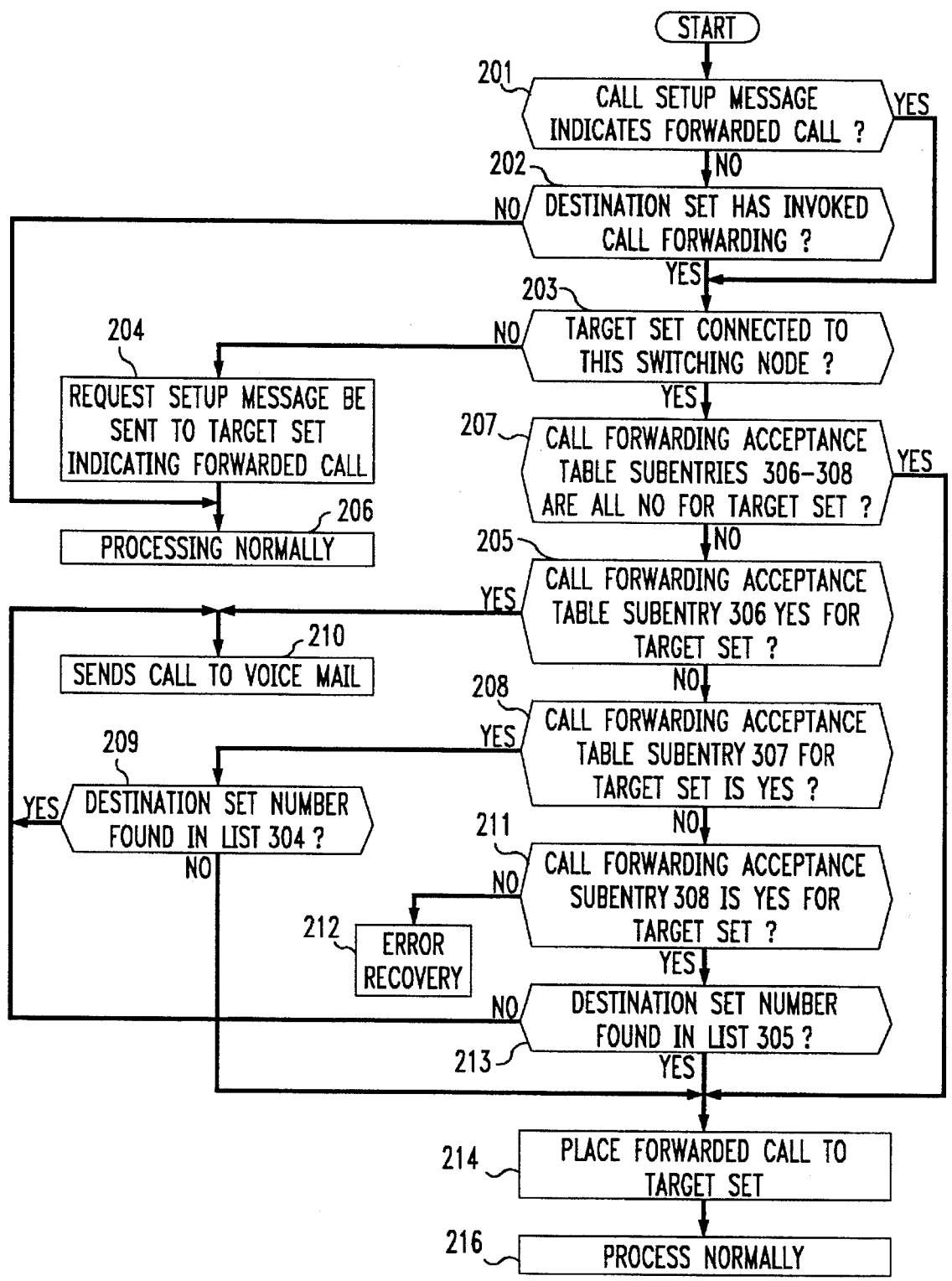
FIGS. 2, 4, and 5 illustrate, in flow chart form, the operations performed by a switching node in a first embodiment.

FIG. 2 illustrates in greater detail the operations performed by a teleprocessing application in implementing the forwarded call control feature. When a BRI station set connected to switching node 101 originates a call, a call set up message is received by teleprocessing application 137. Similarly, if a BRI station set on another switching node originates a call the other switching node sends a call set up message to the teleprocessing application on the node to which the call is directed. Decision block 201 is responsive to a call set up message to determine if the message indicates a forwarded call. Such a set up message would come for example from switching node 104 if BRI station set 103 had designated that calls should be forwarded to BRI station set 106. Teleprocessing application 137 is responsive to such a set up message to transfer control to decision block 203. Decision block 203 determines if the target set (in the present example BRI station set 106) is connected to switching node 101. If the answer is no, teleprocessing application 137 requests that a set up message be sent to the target set indicating a forwarded call. Software levels 130–135 determine the switching node to which the targeted set is connected and send a set up message to that switching node indicating a forwarded call. Such processing by these software levels is designated in block 206 for normal processing.

Returning to decision block 201, if the answer is no, decision block 202 determines whether the destination set which would be on the same switching node as executing the teleprocessing application has invoked call forwarding. If the answer is no, control is transferred to block 206. If the answer is yes, control is transferred to block 203. If the answer in decision block 203 is no, the actions taken have already been described. If the answer in decision block 203 is yes, control is transferred to decision block 207. Decision blocks 205,207,208,209, 211, and 213 utilize the call forwarding acceptance table illustrated in FIG. 3 that is stored in management information base 139. The data shown in lists 304 and 305 is illustrated as telephone numbers for ease of description. However, names or other identification type information could be used in a manner well known to one skilled in the art. Decision block 207 checks if subentries 306, 307, and 308 all have a NO entry. If the answer is yes, this means that all forwarded calls should be transferred to the target BRI station set. Hence, if the answer is yes, control is transferred to block 214 which places the forwarded call to the targeted set, and then control is transferred to block 216 which performs the normal call processing. If the answer in decision block 207 is no, control is transferred to decision block 205. Decision block 205 checks subentry 306. If this subentry is yes, then all forwarded calls are to be blocked and control is transferred to block 210 which sends the call to voice mail system 141.

Figure 3:
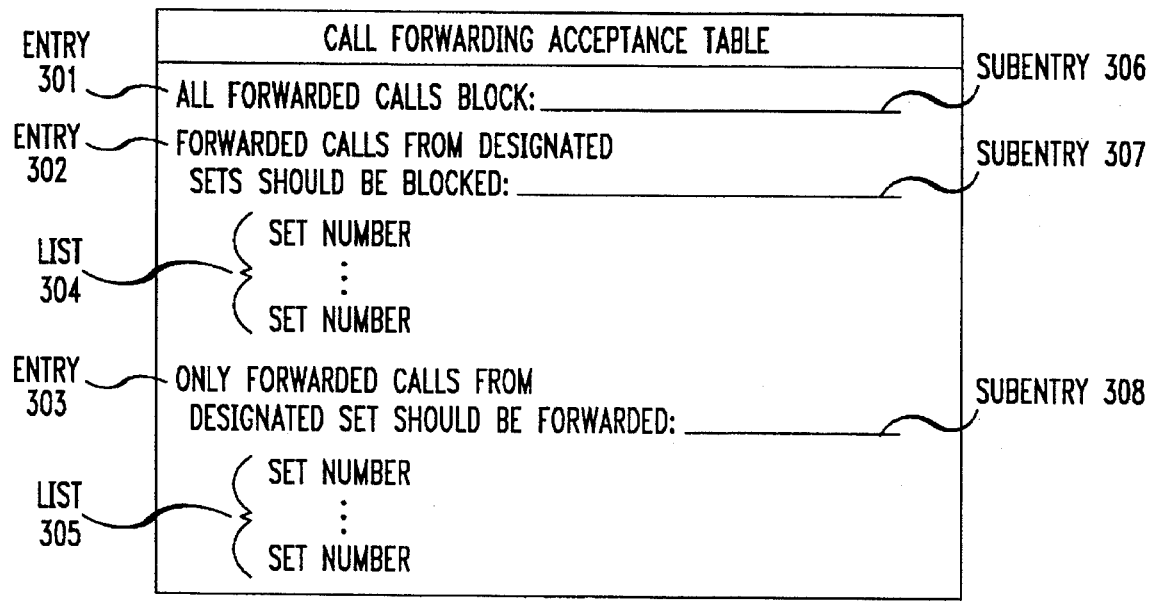
FIG. 3 illustrates the layout of a table.

If the answer in decision block 205 is no, control is transferred to decision block 208 which checks subentry 307 of FIG. 3. If subentry 307 is set equal to YES, this indicates that forwarded calls from designated sets should be blocked. Control is transferred to decision block 209 that checks to see if the number of the destination set is found in list 304. If the answer is yes, control is transferred to block 210. If the answer in decision block 209 is no, control is transferred to block 214.

If the answer in decision block 208 is no, control is transferred to decision block 211. Decision block 211 examines subentry 308 of FIG. 3. If this subentry is set equal to NO, this is an error condition, and control is transferred to error recovery block 212. If the answer is yes, control is transferred to decision block 213. A YES in subentry 308 means that only forwarded calls from designated destination sets will be allowed. Decision block 213 checks to see if the number of the destination set is found in list 305. If the answer is no, control is transferred to block 210 where the forwarded call is sent to voice mail system 141. If the answer is yes in decision block 213, control is transferred to block 214. The resulting actions of blocks 214 and 216 is to transfer the forwarded call to terminal management application 145 of FIG. 1 which completes the call to the target station set. As was described in the incorporated U.S. patent, a terminal management application interfaces with the BRI station sets at a high software level.

Figure 4:
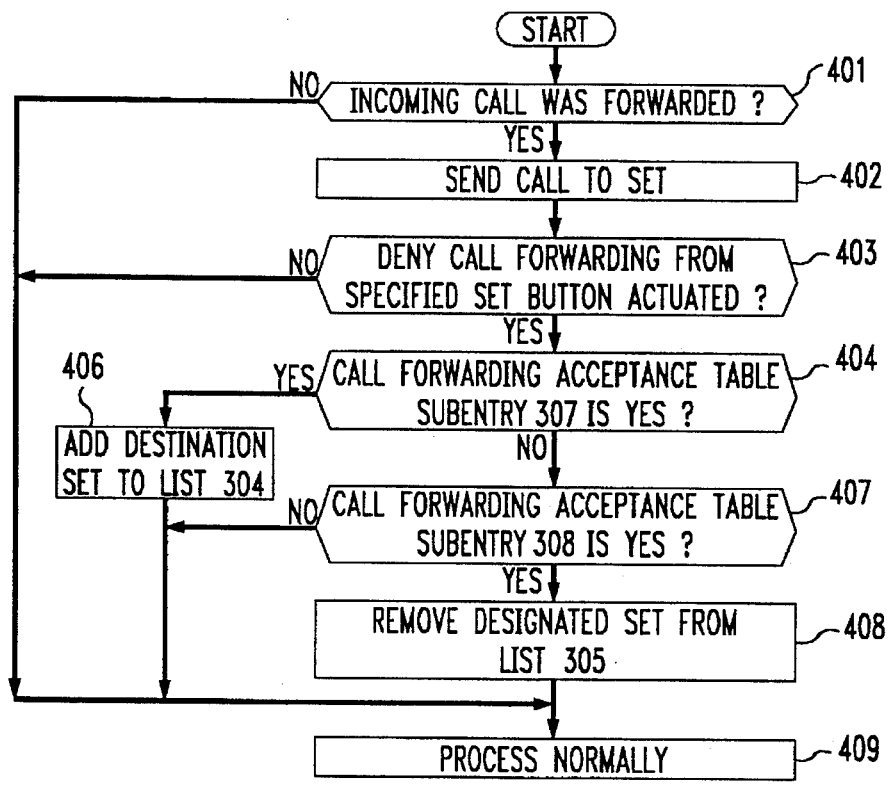

FIG. 4 illustrates the operations performed by a terminal management application in implementing the forwarded call control feature. An incoming call is tested in decision block 401 to determine if the call was forwarded. If the answer is no, control is transferred to block 409 for normal processing. If the answer is yes, the call is sent to the station set. Decision block 403 then determines if the user of the station set has actuated the deny call forwarding from specified set button. If the user of the station set has actuated the deny call forward from a specified set button, it means that the user wants to exclude forwarded calls from that particular station set. If the answer is no, control once again is transferred to block 409. If the answer in decision block 403 is yes, control is transferred to decision block 404.

Decision block 404 interrogates subentry 307 to determine if forwarded calls from designated sets are to be blocked. If the answer is yes, block 406 adds the destination set to list 304 and then transfers control to block 409. If the answer is no, control is transferred to decision block 407 which interrogates subentry 308 of the call forwarding acceptance table. If the answer is YES in this subentry, the user of the target station set wishes to remove the number of the destination set from list 305. This operation is performed by block 408. If the answer is no in decision block 407, control is transferred directly to block 409.

Figure 5:
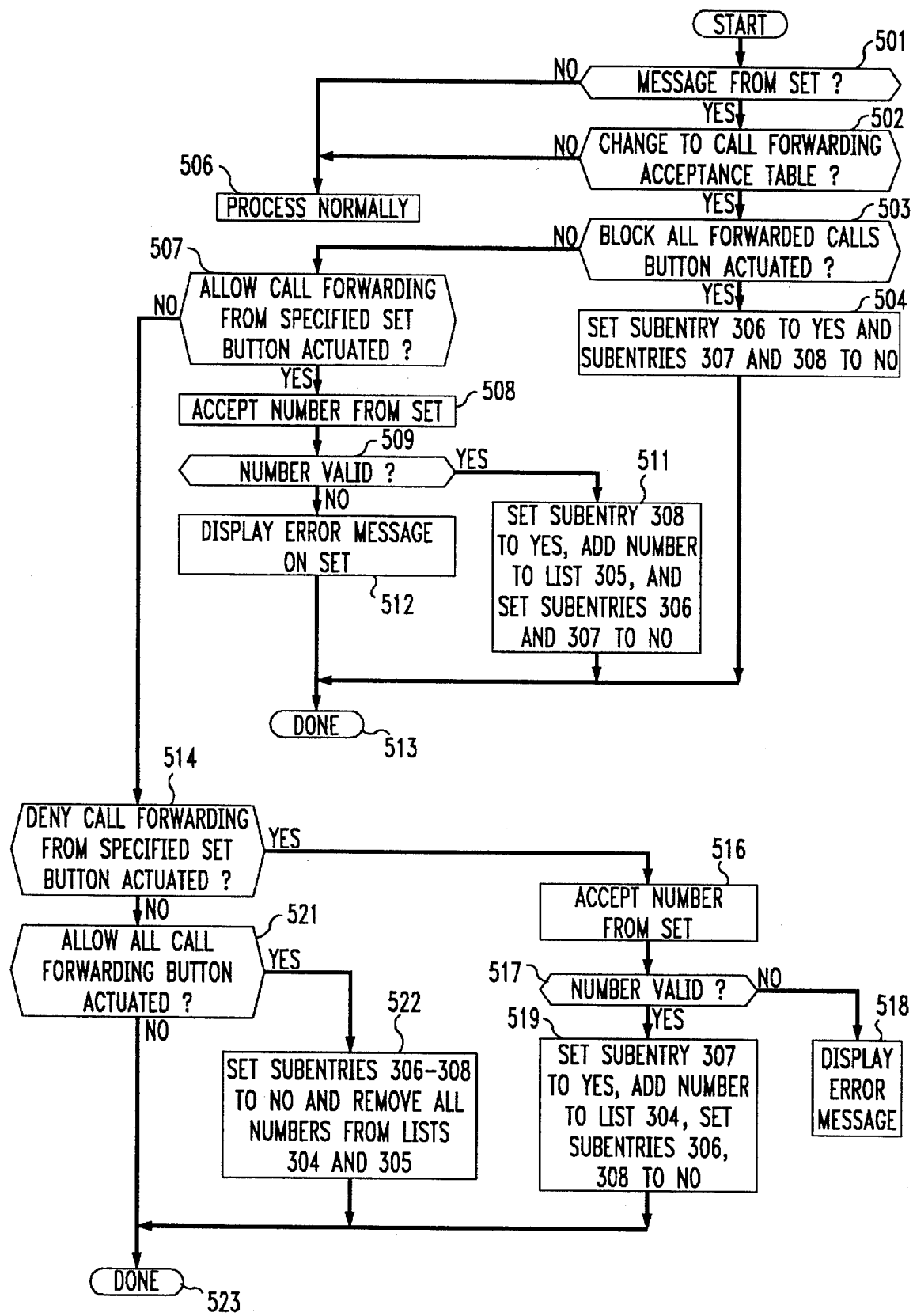

FIG. 5 illustrates the operations performed by a terminal management application such as terminal management application 145 of FIG. 1. Decision block 501 determines if there is a message from the set. If the answer is yes, control is transferred to decision block 502 which determines if the message is one that requires a change to the call forwarding acceptance table as illustrated in FIG. 3. If the answer is no, control is transferred to block 506 for normal processing.

If the answer is yes in decision block 502, decision block 503 checks if the block all forwarded calls button was actuated by the user. If the answer is yes, control is transferred to block 504 which sets subentry 306 to YES and subentries 307 and 308 to NO in the call forwarding acceptance table of the station set transmitting the message. From block 504, control is transferred to block 513. If the answer in decision block 503 is no, decision block 507 determines if the allow call forwarding from specified set button was actuated. If the answer is yes, control is transferred to block 508 which accepts the telephone number that identifies the station set from which forwarded calls will be accepted. Decision block 509 then checks to make sure the number is valid. If the number is not valid, block 512 is executed, and a error message is displayed on the station set. If the number is valid, control is transferred to block 511 which sets subentry 308 of FIG. 3 to YES, adds the station set number to list 305, and sets subentries 306 and 307 to NO. From block 511, control is transferred to block 513.

Returning to decision block 507, if the answer is no, control is transferred to decision block 514. The latter decision block determines if the deny call forwarding from specified set button was actuated. If the answer is yes, control is transferred to blocks 516 and 517 which perform the same operations as described for blocks 508 and 509. If the answer in decision block 517 is yes, control is transferred to block 519 which sets subentry 307 to YES, adds the stations sets number to list 304, and sets subentries 306 and 308 to NO. From block 519, control is transferred to block 523.

Returning to decision block 514, if the answer is no, control is transferred to decision block 521 which checks to see if the allow all call forwarding button is actuated. If the answer is no, control is transferred to block 523. If the answer in decision block 521 is yes, control is transferred to block 522 which sets subentries 306, 307, and 308 to NO and removes all numbers from lists 304 and 305. From block 522, control is transferred to block 523.

Figure 6:
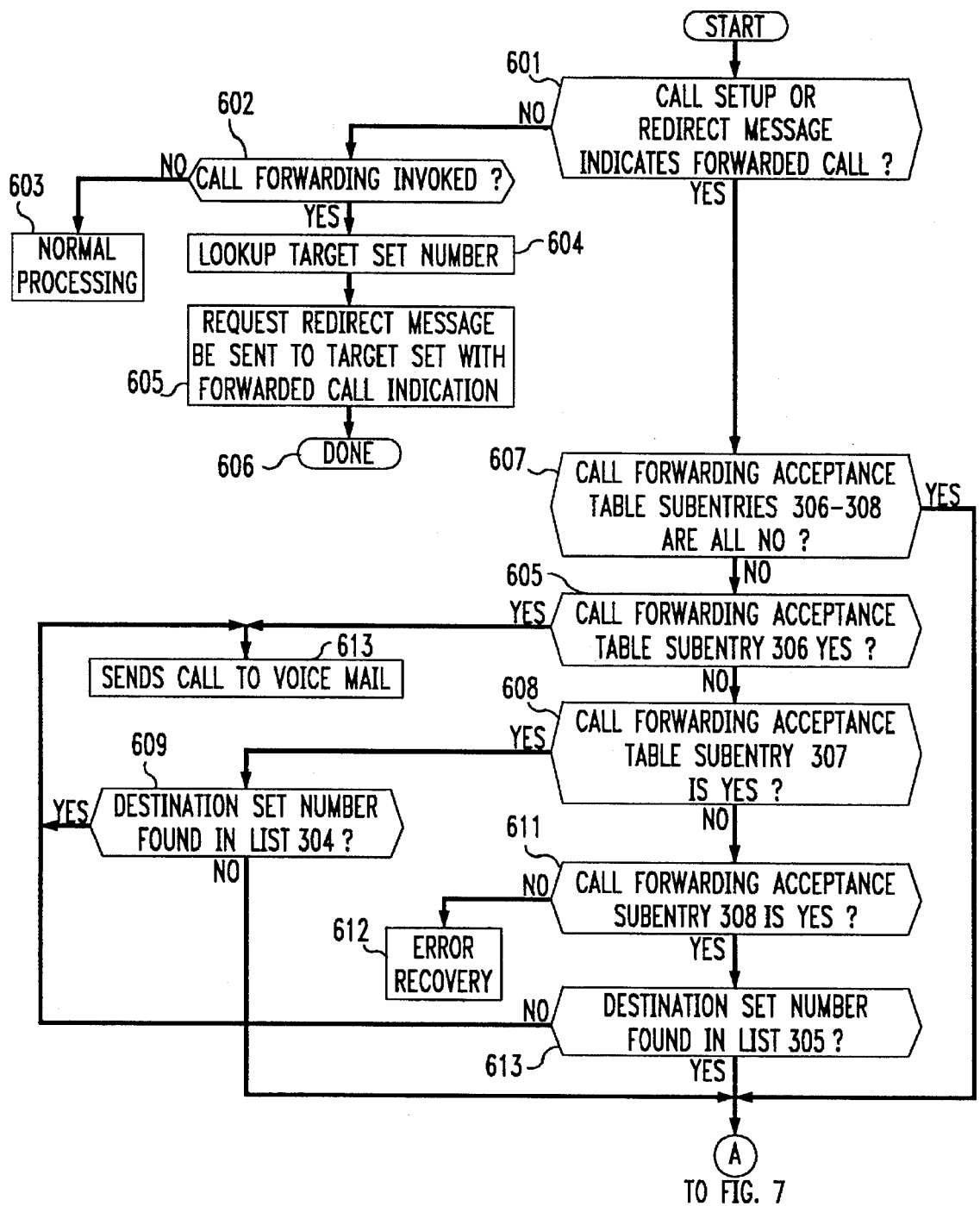
FIGS. 6–8 illustrate, in block diagram form, the operations performed by a communication terminal in a second embodiment.
Figure 7:
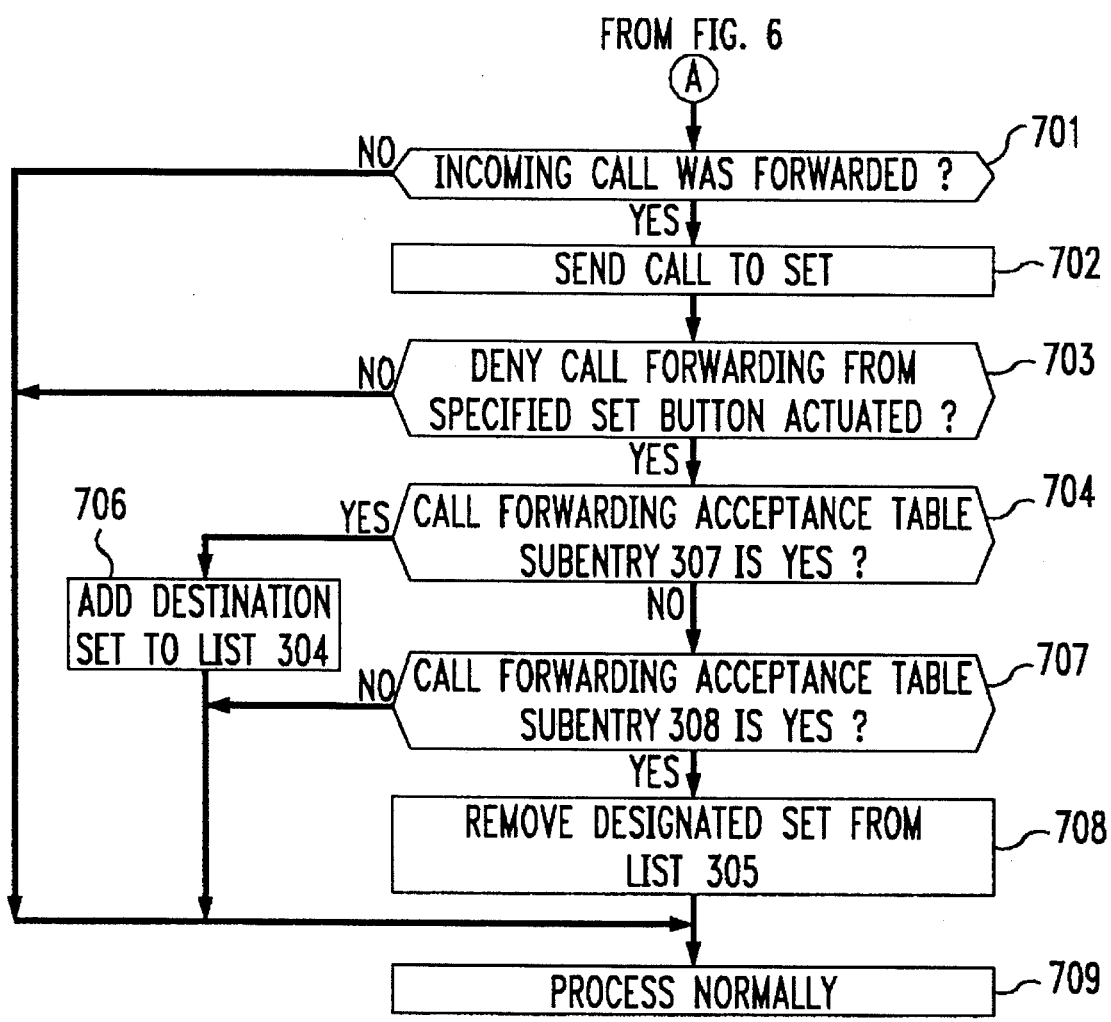
Figure 8:
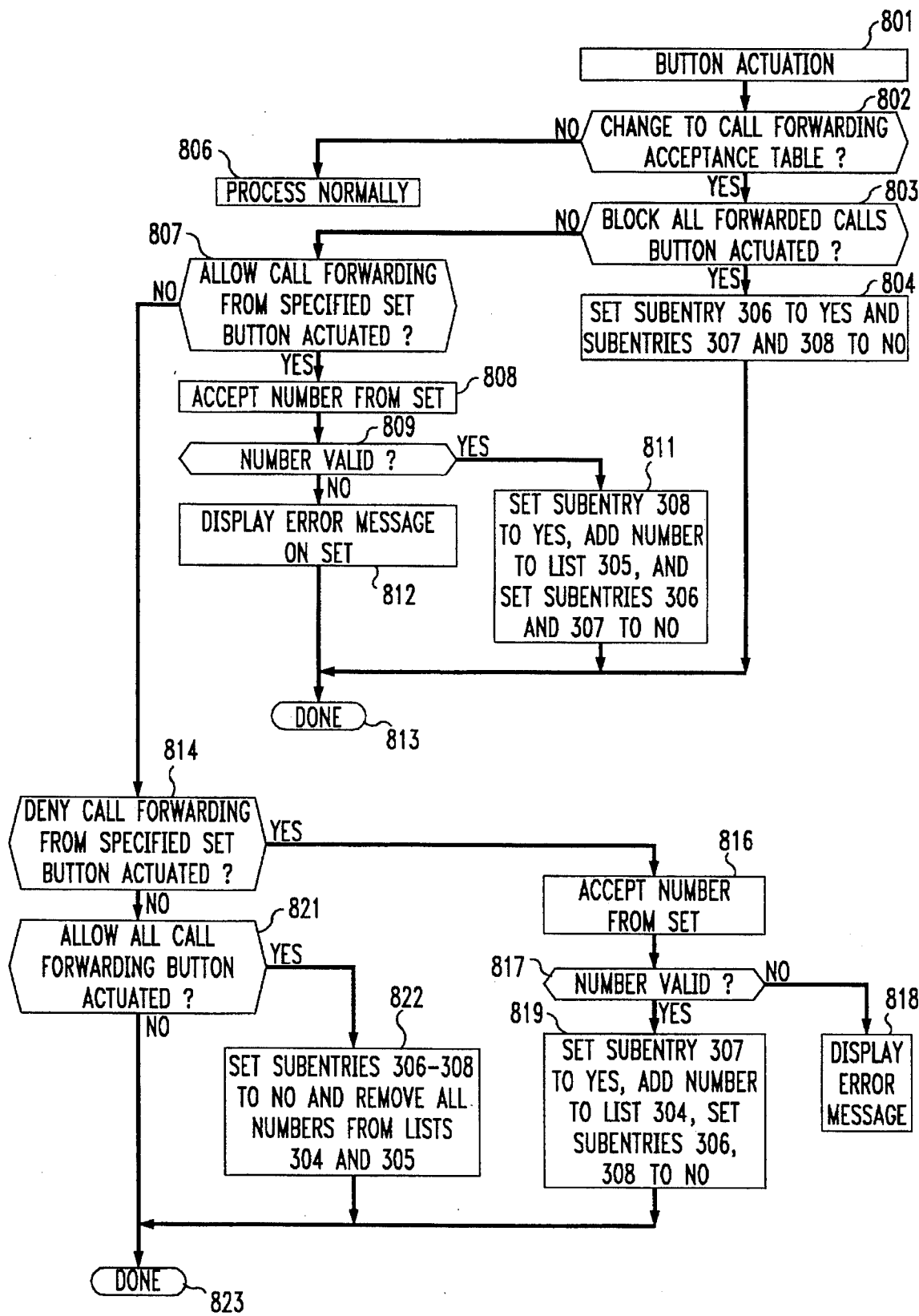

FIGS. 6, 7, and 8 illustrate the operations performed by terminal management applications in a second embodiment of the invention in which the terminal management applications are executing in the station sets. In this second embodiment, the forwarded call control feature is implemented in the BRI station sets. U.S. Pat. No. 5,185,742 discloses that the software structure illustrated in FIG. 1 for switching nodes can be implemented in a station set. That patent is hereby incorporated by reference. In addition, more details on this type of station set are given with respect to FIG. 10. Each terminal management application maintains a portion of the table illustrated in FIG. 3 that pertains to station set that is executing the terminal management application.

FIGS. 6 and 7 illustrates in greater detail the operations performed by a terminal management application in implementing the forwarded call control feature. Decision block 601 determines if the received message is a call setup or redirect message. If the answer is yes, control is transferred to decision block 607. If the answer is no, control is transferred to decision block 602 which determines if call forwarding is invoked by the set. If the answer is no, control is transferred to block 603 for normal processing. If the answer is yes, control is transferred to blocks 604–606 which send a redirect message to the target set indicating a forwarded call.

If the answer in decision block 601 is yes, control is transferred to decision block 607. Decision blocks 605, 607, 608, 609, 611, and 613 utilize the call forwarding acceptance table illustrated in FIG. 3. Decision block 607 checks if subentries 306, 307, and 308 all have a NO entry. If the answer is yes, this means that all forwarded calls will terminate on the target BRI station set. Hence, if the answer is yes, control is transferred to block 614 which accepts the call and alerts the user of the incoming call. If the answer in decision block 607 is no, control is transferred to decision block 605. Decision block 605 checks subentry 306. If this subentry is yes, then all forwarded calls are to be blocked and control is transferred to block 613 which sends the call to voice mail system 141.

If the answer in decision block 605 is no, control is transferred to decision block 608 which checks subentry 307 of FIG. 3. If subentry 307 is set equal to YES, this indicates that forwarded calls from designated sets should be blocked. Control is transferred to decision block 609 that checks to see if the number of the destination set is found in list 304. If the answer is yes, control is transferred to block 613. If the answer in decision block 609 is no, control is transferred to block 614.

If the answer in decision block 608 is no, control is transferred to decision block 611. Decision block 611 examines subentry 308 of FIG. 3. If this subentry is set equal to NO, this is an error condition, and control is transferred to error recovery block 612. If the answer is yes, control is transferred to decision block 613. A YES in subentry 308 means that only forwarded calls from designated destination sets will be allowed. Decision block 613 checks to see if the number of the destination set is found in list 305. If the answer is no, control is transferred to block 613 where the forwarded call is sent to voice mail system 141. If the answer is yes in decision block 613, control is transferred to block 614.

FIG. 7 continues the operation of FIG. 6 after receiving control from block 614. Decision block 703 determines if the user of the station set has actuated the deny call forwarding from specified set button. If the user of the station set has actuated the deny call forward from a specified set button, it means that the user wants to exclude forwarded calls from that particular station set. If the answer is no, control once again is transferred to block 709. If the answer in decision block 703 is yes, control is transferred to decision block 704.

Decision block 704 interrogates subentry 307 to determine if forwarded calls from designated sets are to be blocked. If the answer is yes, block 706 adds the destination set to list 304 and then transfers control to block 709. If the answer is no, control is transferred to decision block 707 which interrogates subentry 308 of the call forwarding acceptance table. If the answer is YES in this subentry, the user of the target station set wishes to remove the number of the destination set from list 305. This operation is performed by block 708. If the answer is no in decision block 707, control is transferred directly to block 709.

FIG. 8 illustrates the operations performed by a terminal management application in a station set that allow a user to enter call forwarding control information. Decision block 801 determines if there has been button actuated on the set. If the answer is yes, control is transferred to decision block 802 which determines if the message is one that requires a change to the call forwarding acceptance table as illustrated in FIG. 3. If the answer is no, control is transferred to block 806 for normal processing.

If the answer is yes in decision block 802, decision block 803 checks if the block all forwarded calls button was actuated by the user. If the answer is yes, control is transferred to block 804 which sets subentry 306 to YES and subentries 307 and 308 to NO in the call forwarding acceptance table of the station set transmitting the message. From block 804, control is transferred to block 813. If the answer in decision block 803 is no, decision block 807 determines if the allow call forwarding from specified set button was actuated. If the answer is yes, control is transferred to block 808 which accepts the telephone number that identifies the station set from which forwarded calls will be accepted. Decision block 809 then checks to make sure the number is valid. If the number is not valid, block 812 is executed, and a error message is displayed on the station set. If the number is valid, control is transferred to block 811 which sets subentry 308 of FIG. 3 to YES, adds the station set number to list 305, and sets subentries 306 and 307 to NO. From block 811, control is transferred to block 813.

Returning to decision block 807, if the answer is no, control is transferred to decision block 814. The latter decision block determines if the deny call forwarding from specified set button was actuated. If the answer is yes, control is transferred to blocks 816 and 817 which perform the same operations as described for blocks 808 and 809. If the answer in decision block 817 is yes, control is transferred to block 819 which sets subentry 307 to YES, adds the stations sets number to list 304, and sets subentries 306 and 308 to NO. From block 819, control is transferred to block 823.

Returning to decision block 814, if the answer is no, control is transferred to decision block 821 which checks to see if the allow all call forwarding button is actuated. If the answer is no, control is transferred to block 823. If the answer in decision block 821 is yes, control is transferred to block 822 which sets subentries 306, 307, and 308 to NO and removes all numbers from lists 304 and 305. From block 822, control is transferred to block 823.

Figure 9:
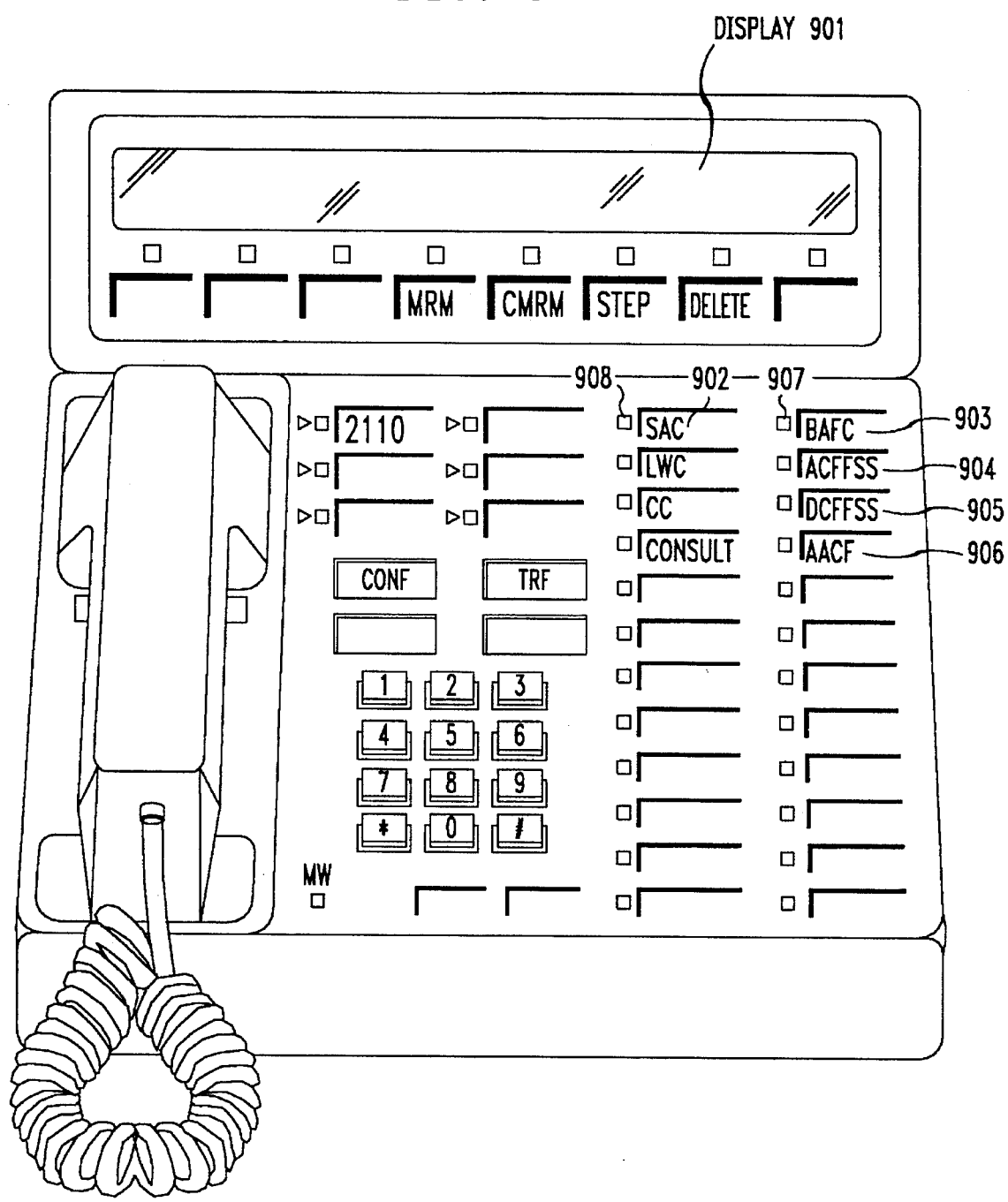
FIG. 9 illustrates a communications terminal.

FIG. 9 illustrates the physical appearance of a BRI station set for implementing the present invention. Display 901 is used to display call information, information entered by a user to modify lists 304 and 305, and error information. The block all forwarded calls button is BAFC 903. The allow call forwarding from specified set button is ACFFSS 904. The deny call forwarding from specified set button is DCFFSS 905. The allow all call forwarding button is AACF 906. Associated with each button 903 through 906 is a light that is turned on when the specified operation of the forwarded call control feature has been invoked by actuation of the corresponding button. For example, when BAFC 903 has been actuated to invoke the block all forwarded calls operation, light 907 is turned on. Light 907 is turned off when one of buttons 904, 905, or 906 is actuated. The lights associated with buttons 904, 905, or 906 operate in a similar manner.

Figure 10:
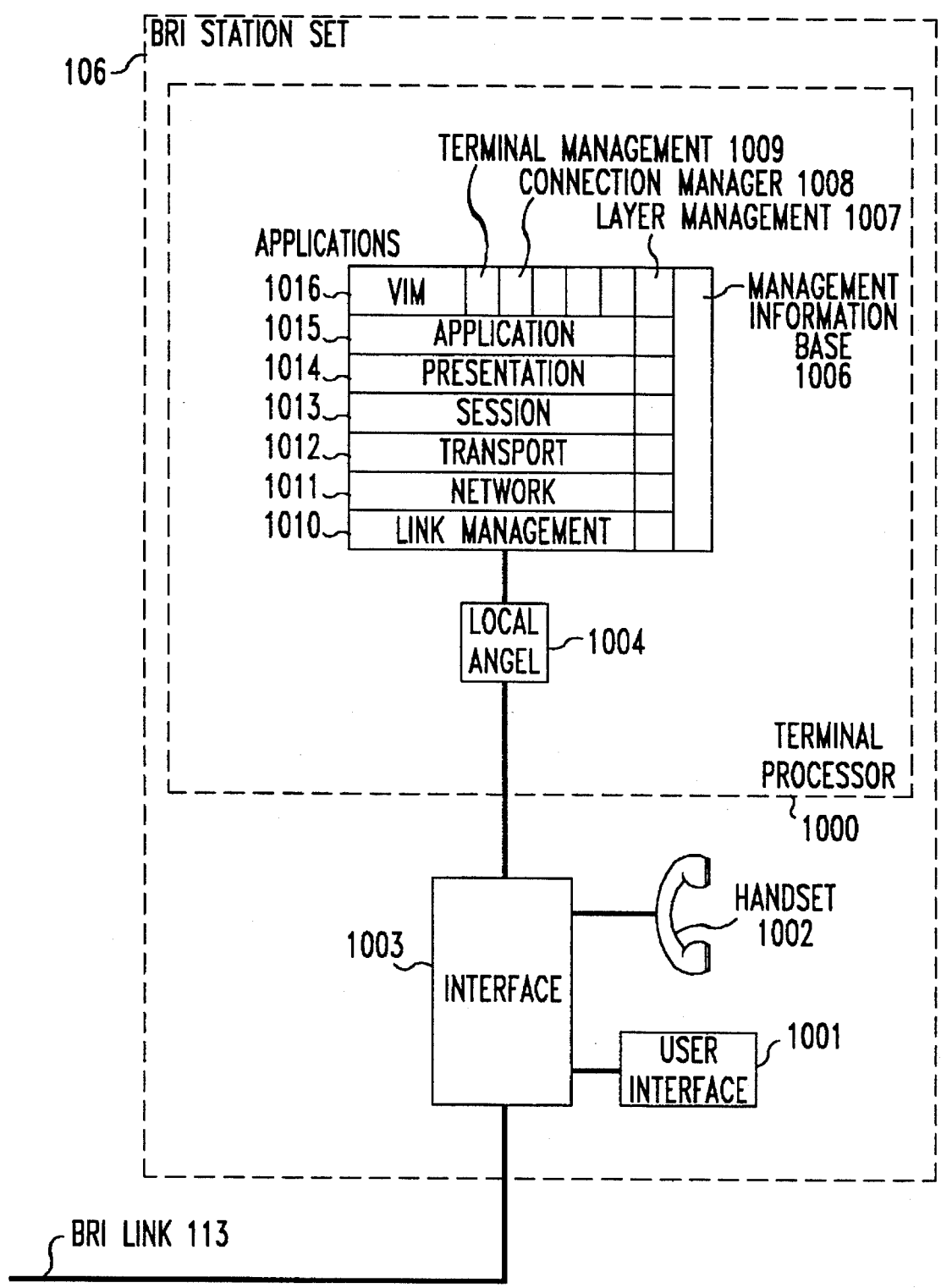
FIG. 10 illustrates, in block diagram form, a communication terminal for implementing the second embodiment.

FIG. 10 illustrates, in block diagram form, a modified BRI station set for use in the second implementation of the invention. It is assumed that all BRI station sets would be modified in the manner shown for BRI station set 106. In the second implementation of the invention, the terminal management and teleprocessing applications do not implement features but serve as gateways for transmitting setup messages and redirect messages between BRI station sets. Software layers 1010 through 1016 are equivalent in operation to software layers 130 through 136 of FIG. 1. These software layers are executed on terminal processor 1000 which also implements local angel 1004. Terminal management 1009 provides the feature operations. Connection manager 1008 is similar in functions to connection manager 140 of FIG. 1.

Interface 1003 interfaces BRI link 113 to terminal processor 1000 and performs functions similar to the interfaces and networks of FIG. 1. Interface 1003 is also responsive to control signals from terminal processor 1000 to connect handset 1002 into voice conversations and to control user interface 1001. User interface 1001 controls the displays, switches, and lights of the station set illustrated in FIG. 9 in the second implementation.

Figure 11:
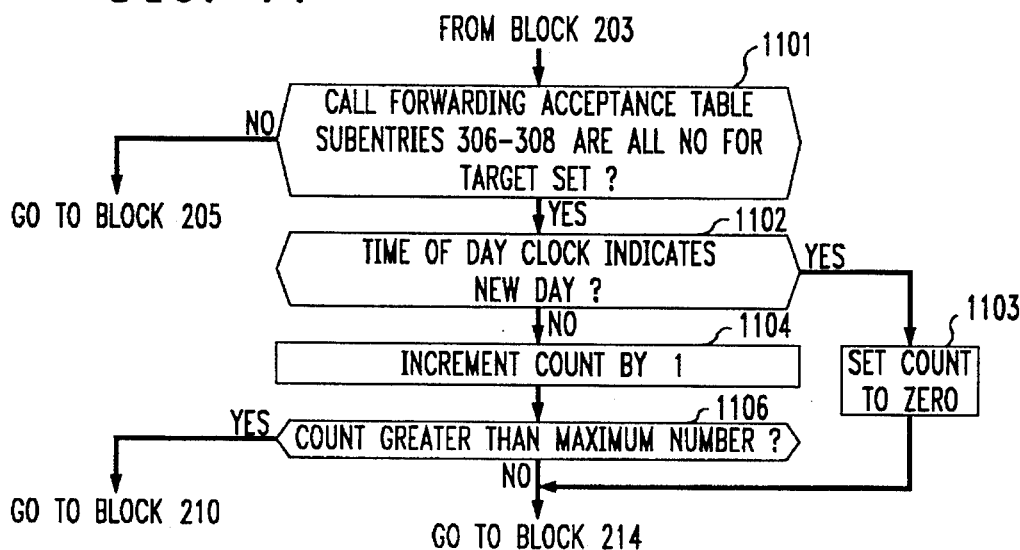
FIGS. 11 and 12 illustrate, in block diagram form, additional operations performed by a switching node in the first embodiment.
Figure 12:
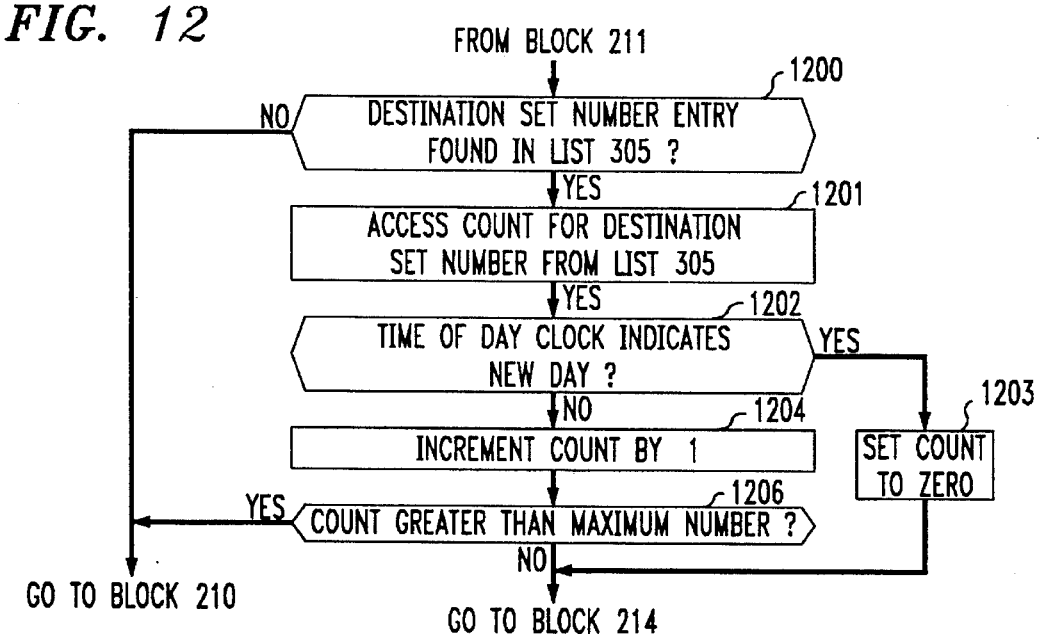
Figure 13:
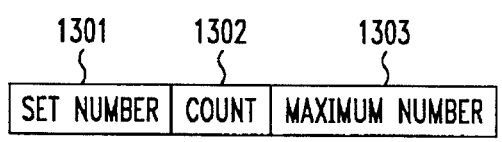
FIG. 13 illustrates an alternate configuration for a word of a list in FIG. 3.

FIGS. 11, 12, and 13 illustrate the modifications that must be made to FIGS. 2 and 3 to implement the sixth aspect of the invention. Blocks 1101–1106 of FIG. 11 replace block 207 of FIG. 2. In addition to the modifications to block 207 a count subentry must be added to entry 301 to count the number of forwarded calls accepted for use in FIG. 11. Decision block 1101 responds to receipt of control from block 203 of FIG. 2 to determine if subentries 306, 307, and 308, are set to no which indicates that all forwarded calls are being accepted. If the answer in decision block 1101 is no, control is transferred to decision block 205 of FIG. 2. If the answer is yes in decision block 1101, control is transferred to decision block 1102. The latter block checks the time of day clock to determine if a new day has begun since the maximum count designates the number of forwarded calls that will be accepted each day. If the answer is yes in decision block 1102, control is transferred to block 1103 which sets the count subentry of entry 301 to zero and transfers control to block 214 of FIG. 2. If the answer is no in decision block 1102, control is transferred to block 1104 which increments the count by "1". Then, decision block 1106 compares the count with maximum number to determine if more than the allowed number of forwarded calls have already been received. If the answer is no, control is transferred to block 214 of FIG. 2. If the answer is yes, control is transferred to block 210 which sends the forwarded call to voice mail system 141 of FIG. 1.

FIG. 12 replaces block 213 of FIG. 2 to provide the sixth aspect of the invention. FIG. 13 illustrates the changes that are made to each item in list 305 of FIG. 3. Decision block 1200 receives control from decision block 211 of FIG. 2 and determines if the destination set number, set number 1301 of FIG. 13, is found in list 305. If the answer is no, control is transferred to decision block 210 of FIG. 2 which sends the forwarded call to voice mail system 141 of FIG. 1. If the answer is yes, block 1201 accesses count 1302 from list 305. The operations of blocks 1202–1206 is similar to the operations of 1102–1106 except that the maximum number of decision block 1206 is maximum number 1303 of FIG. 13.

The sixth aspect of the invention can be provided in the second embodiment by replacing blocks 607 and 613 with FIGS. 11 and 12, respectively.

It is to be understood that the above-described embodiments are merely illustrative of principles of the invention and that other arrangements may be devised by those skilled in the art without departing from the spirit or scope of the invention.

I claim:

1. A method for controlling calls forwarded from a first one of a plurality of communication terminals to a second one of the plurality of communication terminals where forwarded call control is performed by the second one of the plurality of communication terminals and where the plurality of communication terminals and a call coverage system are interconnected by a switching system, the method comprising the steps of:

accepting by the second one of the plurality of communication terminals all calls originated by the first one of the plurality of communication terminals to the second one of the plurality of communication terminals;

accessing by the second one of the plurality of communication terminals a table upon receipt of an indication of a forwarded call to the second one of the plurality of communication terminals for which the tint one of the plurality of communication terminals is the destination communication terminal;

determining by the second one of the plurality of communication terminals from the accessed table if the second one of the plurality of communication terminals is accepting all forwarded calls from all of the plurality of communication terminals;

accepting the forwarded call by the second one of the plurality of communication terminals upon the accessed table indicating that the second one of the plurality of communication terminals is accepting all forwarded calls from all of the plurality of communication terminals;

accessing a first list in the table upon receipt of an indication of the forwarded call by the second one of the plurality of communication terminals for which the first one of the plurality of communication terminals is the destination communication terminal and the accessed table indicating that the second one of the plurality of communication terminals is accepting forwarded calls from ones of the plurality of communication terminals designated in the first list;

determining from the accessed first list if an identification of the first one of the plurality of communication terminals is present in the first list;

accepting the forwarded call by the second one of the plurality of communication terminals upon the accessed first list indicating that the identification of the first one of the plurality of communication terminals is present in the first list; and sending the forwarded call to the call coverage system by the second one of the plurality of communication terminals upon the accessed first list indicating that the identification of the first one of the plurality of communication terminals is not present in the first list.

2. The method of claim 1 further comprising the step of allowing only a predetermined number of forwarded calls to be accepted within a predetermined period of time.

3. The method of claim 1 further comprising the step of removing the identification of the second one of the plurality of communication terminals from the first list upon receiving a command initiated by a user of the second one of the plurality of communication terminals indicating that no more forwarded calls are to be accepted from the first one of the plurality of communication terminals while the forwarded call from the first one of the plurality of communication terminals is being processed.

4. The method of claim 3 further comprising the step of allowing only a predetermined number of forwarded calls from the first communication terminal to be accepted within a predetermined period of time.

5. The method of claim 1 further comprising the step of accessing a second list in the table upon receipt of an indication of the forwarded call by the second one of the plurality of communication terminals for which the first one of the plurality of communication terminals is the destination communication terminal and the table indicating that the second one of the plurality of communication terminals is sending forwarded calls from ones of the plurality of communication terminals designated in the second list to the call coverage system;

determining from the accessed second list if an identification of the first one of the plurality of communication terminals is present in the second list;

accepting the forwarded call by the second one of the plurality of communication terminals upon the accessed second list indicating that the identification of the first one of the plurality of communication terminals is not present in the second list; and sending the forwarded call to the call coverage system by the second one of the plurality of communication terminals via the switching system upon the accessed second list indicating that the identification of the first one of the plurality of communication terminals is present in the second list.

6. The method of claim 5 further comprising the step of adding the identification of the first one of the plurality of communication terminals to the second list upon receiving a command initiated by a user of the second one of the plurality of communication terminals indicating that forwarded calls are to be accepted from the first one of the plurality of communication terminals while the forwarded call from the first one of the plurality of communication terminals is being processed.

7. A method for controlling calls forwarded from a first one of a plurality of communication terminals to a second one of the plurality of communication terminals where forwarded call control is performed by a telecommunication switching system and the telecommunication switching system interconnects the plurality of communication terminals and a call coverage system, comprising the steps of:

terminating all calls via means on the second one of the plurality of communication terminals by the telecommunication switching system that originated to the second one of the plurality of communication terminals by the first one of the plurality of communication terminals;

accessing a table upon receipt of a forwarded call to the second one of the plurality of communication terminals for which the first one of the plurality of communication terminals is the destination communication terminal;

determining from the accessed table if the second one of the plurality of communication terminals is accepting all forwarded calls from all of the plurality of communication terminals;

terminating the forwarded call via means on the second one of the plurality of communication terminals upon the accessed table indicating that the second one of the plurality of communication terminals is accepting all forwarded calls from all of the plurality of communication terminals;

accessing a first list in the table by the telecommunication switching system upon receipt of the forwarded call to the second one of the plurality of communication terminals for which the first one of the plurality of communication terminals is the destination communication terminal and the accessed table indicating that the second one of the plurality of communication terminals is accepting forwarded calls from ones of the plurality of communication terminals designated in the first list;

determining from the accessed first list by the telecommunication switching system if an identification of the first one of the plurality of communication terminals is present in the first list;

terminating the forwarded call via means on the second one of the plurality of communication terminals by the telecommunication switching system upon the accessed first list indicating that the identification of the first one of the plurality of communication terminals is present in the first list; and sending the forwarded call to the call coverage system by the telecommunication switching system upon the accessed first list indicating that the identification of the first one of the plurality of communication terminals is not present in the first list.

8. The method of claim 7 further comprising the step of allowing only a predetermined number of forwarded calls to be terminated within a predetermined period of time.

9. The method of claim 7 further comprising the step of removing the identification of the first one of the plurality of communication terminals from the first list by the telecommunication switching system upon receiving a command from the second one of the plurality of communication terminals resulting from an action of a user of the second one of the plurality of communication terminals indicating that no more forwarded calls are to be accepted from the first one of the plurality of communication terminals while the forwarded call from the first one of the plurality of communication terminals is being processed.

10. The method of claim 9 further comprising the step of allowing only a predetermined number of forwarded calls from the first one of the plurality of communication terminals to be terminated within a predetermined period of time.

11. The method of claim 7 further comprising the step of accessing a second list in the table by the telecommunication switching system upon receipt of an indication of the forwarded call to the second one of the plurality of communication terminals for which the first one of the plurality of communication terminals is the destination communication terminal and the table indicating that the second one of the plurality of communication terminals is sending forwarded calls from ones of the plurality of communication terminals designated in the second list to the call coverage system;

determining from the accessed second list by the telecommunication switching system if an identification of the first one of the plurality of communication terminals is present in the second list;

terminating the forwarded call by telecommunication switching system on the second one of the plurality of communication terminals upon the accessed second list indicating that the identification of the first one of the plurality of communication terminals is not present in the second list; and sending the forwarded call to the call coverage system by the telecommunication switching system upon the accessed second list indicating that the identification of the first one of the plurality of communication terminals is present in the second list.

12. The method of claim 11 further comprising the step of adding the identification of the first one of the plurality of communication terminals to the second list by the telecommunication switching system upon receiving a command from the second one of the plurality of communication terminals resulting from an action of a user of the second one of the plurality of communication terminals indicating that forwarded calls are to be accepted from the first one of the plurality of communication terminals while the forwarded call from the first one of the plurality of communication terminals is being processed.

13. One of a plurality of communication terminals controlling calls forwarded to the one of the plurality of communication terminals from another one of the plurality of communication terminals and the plurality of communication terminals and a call coverage system are interconnected by a switching system, the one of the plurality of communications terminals comprising:

means for accepting all calls originated by the other one of the plurality of communication terminals;

means for accessing a table upon receipt of an indication of a forwarded call for which the other one of the plurality of communication terminals is the destination communication terminal;

means for determining from the accessed table if the one of the plurality of communication terminals is accepting all forwarded calls from all of the plurality communication terminals;

means for accepting the forwarded call upon the means for determining from the accessed table indicating that the one of the plurality of communication terminals is accepting all forwarded calls from all of the plurality of communication terminals;

means for accessing a first list in the table upon receipt of an indication of the forwarded call for which the other one of the plurality of communication terminals is the destination communication terminal and the accessed table indicating that the one of the plurality of communication terminals is accepting forwarded calls from ones of the plurality of communication terminals designated in the first list;

means for determining from the accessed first list if an identification of the other one of the plurality of communication terminals is present in the first list;

means for accepting the forwarded call upon the accessed first list indicating that the identification of the other one of the plurality of communication terminals is present in the first list; and means for sending the forwarded call to the call coverage system upon the accessed first list indicating that the identification of the other one of the plurality of communication terminals is not present in the first list.

14. The one of the plurality of communication terminals of claim 13 further comprising means for allowing only a predetermined number of forwarded calls to be accepted within a predetermined period of time.

15. The one of the plurality of communication terminals of claim 13 further comprising means for removing the identification of the other one of the plurality of communication terminals from the first list upon receiving a command initiated by a user of the one of the plurality of communication terminals indicating that no more forwarded calls are to be accepted from the other one of the plurality of communication terminals while the forwarded call from the other one of the plurality of communication terminals is being processed.

16. The one of the plurality of communication terminals of claim 15 further comprising means for allowing only a predetermined number of forwarded calls from the other one of the plurality of communication terminals to be accepted within a predetermined period of time.

17. The one of the plurality of communication terminals of claim 13 further comprising means for accessing a second list in the table upon receipt of an indication of the forwarded call to the one of the plurality of communication terminals for which the other one of the plurality of communication terminals is the destination communication terminal and the table indicating that the one of the plurality of communication terminals is sending forwarded calls from ones of the plurality of communication terminals designated in the second list to the call coverage system;

means for determining from the accessed second list if an identification of the other one of the plurality of communication terminals is present in the second list;

means for accepting the forwarded call upon the accessed second list indicating that the identification of the other one of the plurality of communication terminals is not present in the second list; and means for sending the forwarded call to the call coverage system via the switching system upon the accessed second list indicating that the identification of the other one of the plurality of communication terminals is present in the second list.

18. The one of the plurality of communication terminals of claim 17 further comprising means for adding the identification of the other one of the plurality of communication terminals to the second list upon receiving a command initiated by a user of the one of the plurality of communication terminals indicating that forwarded calls are to be accepted from the other one of the plurality of communication terminals while the forwarded call from the other one of the plurality of communication terminals is being processed.

19. A telecommunication switching system for controlling calls forwarded from a first one of a plurality of communication terminals to a second one of the plurality of communication terminals and the telecommunication switching system interconnecting the plurality of communication terminals and a call coverage system, the telecommunication switching system comprising:

means for terminating all calls on the second one of the plurality of communication terminals that originated by the first one of the plurality of communication terminals to the second one of the plurality of communication terminals;

means for accessing a table upon receipt of an indication of a forwarded call for which the first one of the plurality of communication terminals is the destination communication terminal;

means for determining from the accessed table if the second one of the plurality of communication terminals is accepting all forwarded calls from all of the plurality communication terminals;

means for terminating the forwarded call on the second one of the plurality of communication terminals upon the accessed table indicating that the second one of the plurality of communication terminals is accepting all forwarded calls from all of the plurality of communication terminals;

means for accessing a first list in the table upon receipt of an indication of the forwarded call for which the first one of the plurality of communication terminals is the destination communication terminal and the accessed table indicating that the second one of the plurality of communication terminals is accepting forwarded calls from ones of the plurality of communication terminals designated in the first list;

means for determining from the accessed first list if an identification of the first one of the plurality of communication terminals is present in the first list;

means for terminating the forwarded call on the second one of the plurality of communication terminals upon the first list indicating that the identification of the first one of the plurality of communication terminals is present in the first list; and means for sending the forwarded call to the call coverage system upon the accessed first list indicating that the identification of the first one of the plurality of communication terminals is not present in the first list.

20. The telecommunication switching system of claim 19 further comprising means for allowing only a predetermined number of forwarded calls to be terminated within a predetermined period of time.

21. The telecommunication switching system of claim 19 further comprising means for removing the identification of the first one of the plurality of communication terminals from the first list upon receiving a command from the second one of the plurality of communication terminals resulting from an action of a user of the second one of the plurality of communication terminals indicating that no more forwarded calls are to be accepted from the first one of the plurality of communication terminals while the forwarded call from the first one of the plurality of communication terminals is being processed.

22. The telecommunication switching system of claim 21 further comprising means for allowing only a predetermined number of forwarded calls from the first one of the plurality of communication terminals to be terminated within a predetermined period of time.

23. The telecommunication switching system of claim 19 further comprising means for accessing a second list in the table upon receipt of an indication of the forwarded call to the second one of the plurality of communication terminals for which the first one of the plurality of communication terminals is the destination communication terminal and the table indicating that the second one of the plurality of communication terminals is sending forwarded calls from ones of the plurality of communication terminals designated in the second list to the call coverage system;

means for determining from the accessed second list if an identification of the first one of the plurality of communication terminals is present in the second list;

means for terminating the forwarded call on the second one of the plurality of communication terminals upon the accessed second list indicating that the identification of the first one of the plurality of communication terminals is not present in the second list; and means for sending the forwarded call to the call coverage system upon the accessed second list indicating that the identification of the first one of the plurality of communication terminals is present in the second list.

24. The telecommunication switching system of claim 23 further comprising means for adding the identification of the first one of the plurality of communication terminals to the second list upon receiving a command from the second one of the plurality of communication terminals resulting from an action of a user of the second one of the plurality of communication terminals indicating that forwarded calls are to be accepted from the first one of the plurality of communication terminals while the forwarded call from the first one of the plurality of communication terminals is being processed.

* * * * *